US009739445B2

United States Patent
Feng et al.

(10) Patent No.: US 9,739,445 B2
(45) Date of Patent: Aug. 22, 2017

(54) BACKLIGHT MODULE HAVING TWO LIGHT SOURCE LAYERS AND DISPLAY DEVICE

(71) Applicants: Boe Technology Group Co., Ltd., Beijing (CN); Beijing Boe Display Technology Co., Ltd., Beijing (CN)

(72) Inventors: Lan Feng, Beijing (CN); Zheng Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 258 days.

(21) Appl. No.: 14/653,952

(22) PCT Filed: Aug. 29, 2014

(86) PCT No.: PCT/CN2014/085534
§ 371 (c)(1),
(2) Date: Jun. 19, 2015

(87) PCT Pub. No.: WO2015/172461
PCT Pub. Date: Nov. 19, 2015

(65) Prior Publication Data
US 2016/0265737 A1    Sep. 15, 2016

(30) Foreign Application Priority Data

May 16, 2014    (CN) .......................... 2014 1 0207184

(51) Int. Cl.
*F21V 7/05*    (2006.01)
*F21V 5/02*    (2006.01)
(Continued)

(52) U.S. Cl.
CPC ................. *F21V 5/02* (2013.01); *F21V 5/04* (2013.01); *F21V 7/0033* (2013.01); *F21V 7/05* (2013.01);
(Continued)

(58) Field of Classification Search
CPC .. F21V 5/004; F21V 7/0033; G02F 1/133603; G02F 1/133606; G02F 1/133607; G02F 1/133611; G02F 2001/133614
See application file for complete search history.

(56) References Cited

U.S. PATENT DOCUMENTS

2015/0003109 A1*    1/2015  Wu ..................... G02B 6/0035
                                                        362/612

FOREIGN PATENT DOCUMENTS

CN    101335266    12/2008
CN    201318632    9/2009
(Continued)

OTHER PUBLICATIONS

Office action from Chinese Application No. 201410207184.9 dated Dec. 1, 2015.
(Continued)

*Primary Examiner* — Karabi Guharay
(74) *Attorney, Agent, or Firm* — Calfee, Halter & Griswold LLP

(57) ABSTRACT

The present invention provides a backlight module and a display device; the backlight module comprises: a first light source layer located at a surface of a light emitting side of the backlight module, the first light source layer comprises a plurality of first light source elements arranged with intervals; a second light source layer located at a surface opposite to the light emitting side of the backlight module, wherein the second light source layer comprises a plurality of second light source elements arranged one-to-one corre-
(Continued)

sponding to positions of the intervals between adjacent first light source elements; and optical components arranged between the first light source layer and the second light source layer, the optical components change propagation path of light from the second light source elements irradiating the first light source elements such that the light is emitted through the intervals.

20 Claims, 2 Drawing Sheets

(51) Int. Cl.
*F21V 5/04* (2006.01)
*F21V 7/00* (2006.01)
*G02F 1/1335* (2006.01)

(52) U.S. Cl.
CPC .. *G02F 1/133603* (2013.01); *G02F 1/133606* (2013.01); *G02F 2001/133607* (2013.01)

(56) References Cited

FOREIGN PATENT DOCUMENTS

| CN | 101749666 | 6/2010 |
|---|---|---|
| CN | 102128391 | 7/2011 |
| CN | 102644879 | 8/2012 |
| KR | 1020070077255 | 7/2007 |
| KR | 100912426 | 8/2009 |
| TW | 201232114 | 8/2012 |
| WO | 2007/037047 | 4/2007 |
| WO | 2008/149566 | 12/2008 |

OTHER PUBLICATIONS

International Search Report and Written Opinion from PCT/CN14/085534 dated Feb. 16, 2015.

\* cited by examiner

BACKLIGHT MODULE HAVING TWO LIGHT SOURCE LAYERS AND DISPLAY DEVICE

The present application is the U.S. national phase entry of PCT/CN2014/085334, with an international filing date of Aug. 29, 2014, which claims the benefit of Chinese Patent Application No. 20141027184.9, filed May 16, 2014, the entire disclosures of which are incorporated herein by reference.

FIELD OF THE INVENTION

The present invention relates to the technical field of display, in particular to a backlight module and a display device.

BACKGROUND OF THE INVENTION

Light emitted from a display device in operation is provided by a back light source. Backlight sources in the prior art mainly comprises side type backlight source and direct type backlight source; the principle of the backlight source is providing light to a display device, which light is emitted from light source elements set in a backboard of the backlight source.

Defects of the prior art are that: the brightness adjustment of the display device in the prior art is realized by adjusting the electric current of all the light source elements in the backlight source, the adjustment range is relatively small; moreover, even in a situation that a low brightness is required for the display device, all the light source elements are still in working condition, affecting the service life of the backlight source.

SUMMARY OF THE INVENTION

The present invention provides a backlight module and a display device to improve the adjustment range of the brightness for the display device, improving the display effect of the display device.

An embodiment of the present invention provides a backlight module; the backlight module comprises:

a first light source layer located at a surface of a light emitting side of the backlight module, the first light source layer comprises a plurality of first light source elements arranged with intervals;

a second light source layer located at a surface opposite to the light emitting side of the backlight module, wherein the second light source layer comprises a plurality of second light source elements arranged one-to-one corresponding to positions of the intervals between adjacent first light source elements; and optical components arranged between the first light source layer and the second light source layer, the optical components change propagation path of light from the second light source elements irradiating the first light source elements such that the light is emitted through the intervals.

In the above mentioned embodiment, light can be provided to the display device by applying one or both of the light source layers, improving the adjustable range of the display brightness for the display device; meanwhile, in a situation that a low brightness is required for the display device, one of the first and the second light source layers can be turned off, reducing the operation time for a part of the light source elements, thereby improving the service life of the light source elements; moreover, when one of the first and the second light source layers fails, another light source layer can still provide light for the display device to ensure the normal operation of the display device, improving the emergency capability of the display device; furthermore, the utilization of light can also be improved by applying the optical components.

Preferably, the optical components comprise lenses, the lenses are arranged one-to-one corresponding to every second light source elements and change propagation path of light from the second light source elements irradiating the first light source elements such that the light is emitted through the intervals. The light emitted from the second light source elements can be refracted by the lenses; and propagation path of the light irradiating the first light source elements is changed such that the light irradiates the display panel.

Preferably, the lenses are triple prisms or convex lenses. Different lenses can be selected for changing the propagation path of the light.

Preferably, the diameter of the convex lens is 1~2 times of the width of the second light source element. In this way it is ensured that the propagation path of the light emitted from the second light source elements can be changed by the convex lenses.

Preferably, the diameter of the convex lens is two times of the width of the second light source element. In this way it is further ensured that the propagation path of the light emitted from the second light source elements can be changed by the convex lenses, meanwhile the manufacture of the convex lenses is facilitated.

Preferably, the triple prisms are normal triple prisms. In this way it is ensured that the propagation path of the light emitted from the second light source elements can be changed by the normal triple prisms.

Preferably, the optical components comprise a first reflective layer arranged on a side of the first light source elements facing the second light source elements, and a second reflective layer arranged between adjacent second light source elements. The light irradiating the first light source elements is reflected by the reflective sheet such that the light can irradiate the display panel.

Preferably, the width of the second light source element is not greater than the width of the interval between adjacent first light source elements. In this way, it can be avoided that much light is blocked by the first light source elements.

Preferably, both the first light source elements and the second light source elements are organic light emitting diode lamp strips. In this way a good light emitting can be ensured.

The present invention also provides a display device and an electronic equipment comprising the display device; wherein the display device comprises a display panel and above mentioned backlight module, the backlight module is arranged on a light inputting side of the display panel.

In the above mentioned embodiments, light can be provided to the display device by applying one or both of the light source layers, improving the adjustable range of the display brightness for the display device; meanwhile, in a situation that a low brightness is required for the display device, one of the first and the second light source layers can be turned off, reducing the operation time for a part of the light source elements, thereby improving the service life of the light source elements; moreover, when one of the first and the second light source layers fails, another light source layer can still provide light for the display device to ensure the normal operation of the display device, improving the emergency capability of the display device; furthermore, the utilization of light can also be improved by applying the optical components.

REFERENCE SIGNS

10—display panel
20—first light source layer
21—first light source elements
30—second light source layer
31—second light source elements
40—optical components
41—second reflective layer
42—first reflective layer
43—lenses
431—convex lenses
432—triple prisms.

DETAILED DESCRIPTION OF THE INVENTION

The present invention provides a backlight module and a display device to improve the adjustment range of the brightness for the display device, improving the display effect of the display device. In the embodiments of the present invention, two layers of light source elements are provided, thereby improving the adjustment range of light for the backlight module, and improving the display effect of the display device. The present invention will be described below in more detail in combination with the drawings and the embodiments to make the objects, solutions and advantages of the present invention clearer. The following embodiments are used for explanation of the present invention, not for limitation of the scope of the present invention.

Figure 1:
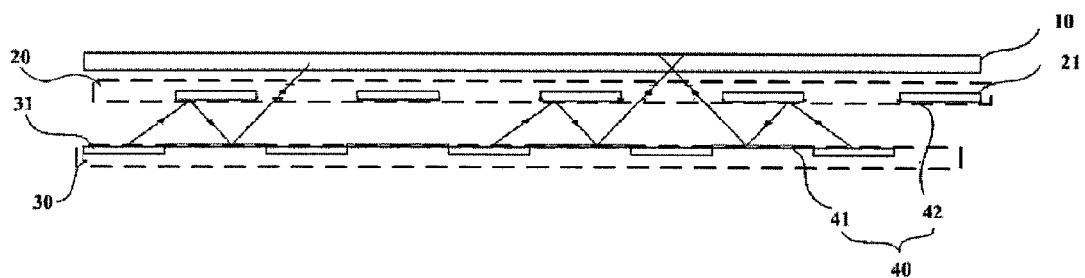
FIG. 1 is a structural schematic diagram of a backlight module provided by an embodiment of the present invention.
Figure 2:
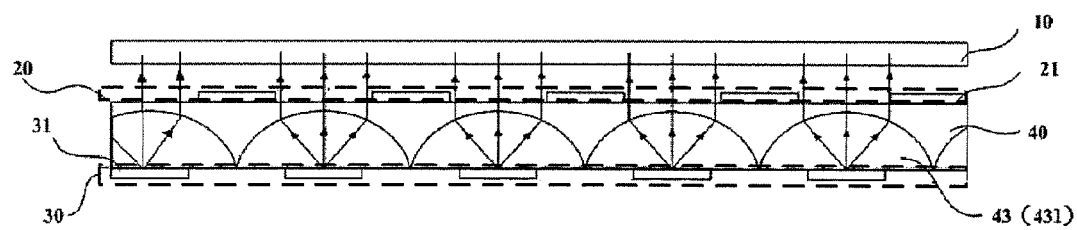
FIG. 2 is a structural schematic diagram of a backlight module provided by another embodiment of the present invention.

As shown in FIGS. 1 and 2, FIG. 1 shows a structural schematic diagram of a backlight module provided by an embodiment of the present invention; and FIG. 2 shows a structural schematic diagram of a backlight module provided by another embodiment of the present invention.

An embodiment of the present invention provides a backlight module; the backlight module comprises:

a first light source layer 20 located at a surface of a light emitting side of the backlight module, the first light source layer 20 comprises a plurality of first light source elements 21 arranged with intervals;

a second light source layer 30 located at a surface opposite to the light emitting side of the backlight module, wherein the second light source layer 30 comprises a plurality of second light source elements 31 arranged one-to-one corresponding to positions of the intervals between adjacent first light source elements 21; and optical components 40 arranged between the first light source layer 20 and the second light source layer 30, the optical components 40 change propagation path of light from the second light source elements 31 irradiating the first light source elements 21 such that the light is emitted through the intervals.

During the operation of the backlight module provided by the above mentioned embodiment, light can be provided to the display device by the first light source layer 20 or the second light source layer 30 separately. When light is provided to the display device by the second light source layer 30 separately, a part of the light emitted from the second light source elements 31 of the second light source layer 30 directly irradiates the display panel 10 after passes through the intervals between the first light source elements 21 in the first light source layer 20; the propagation path of another part of the light originally irradiating the first light source elements 21 is changed by the optical components 40, such that the light also irradiates the display panel 10 after passes through the intervals between the first light source elements 21. In this manner, the light originally blocked by the first light source elements 21 can irradiate the display panel 10 after passes through the intervals, thereby improving the utilization of light, providing a brighter image displayed by the display device, and improving the display effect of the display device.

In the above mentioned embodiment, light can be provided to the display device by separately applying the first light source layer 20, separately applying the second light source layer 30, or simultaneously applying both of the light source layers, improving the adjustable range of the display brightness for the display device; meanwhile, in a situation that a low brightness is required for the display device, one of the first light source layer 20 and the second light source layer 30 can be turned off, reducing the operation time for the turned-off light source elements, thereby improving the service life of the light source elements; moreover, when one of the first light source layer 20 and the second light source layer 30 fails, another light source layer can still provide light for the display device to ensure the normal operation of the display device, improving the emergency capability of the display device; furthermore, the utilization of light can also be improved by applying the optical components.

Wherein the width of the second light source element 31 is not greater than the width of the interval between adjacent first light source elements 21. In this way, it is ensured that more light emitted from the second light source elements 31 can pass through the intervals between the first light source elements 21, improving the situation that the light emitted from the second light source elements 31 is blocked by the first light source elements 21.

The optical components 40 can be optical components 40 with different structures. The structures of the optical components 40 in the display device provided by the embodiments of the present invention are illustrated in detail with FIGS. 1-3.

Embodiment 1

FIG. 1 shows a structure of the optical components. In particular, the optical components 40 can comprise a first reflective layer 42 arranged on a side of the first light source elements 21 facing the second light source elements 31, and a second reflective layer 41 arranged between adjacent second light source elements 31.

In particular, the first reflective layer 42 and the second reflective layer 41 can be metal layers with high reflectance. During the operation of the display device provided by the embodiment of the present invention, as shown in FIG. 1, a part of light emitted from the second light source elements 31 irradiates the first light source elements 21. In such a situation, the light is reflected by the first reflective layer 42, which is arranged on the first light source elements 21; after being reflected, the light then irradiates the second reflective layer 41 between the second light source elements 31, undergoes reflecting of the second reflective layer 41, and irradiates the display panel 10 through the intervals between the first light source elements 21. In this manner, the light irradiating the first light source elements 21 and originally blocked by the first light source elements 21 can irradiate the display panel 10 after passes through the intervals, thereby improving the utilization of light, providing a brighter image displayed by the display device, and improving the display effect of the display device. The first reflective layer 42 and the second reflective layer 41 can be made of metal with high reflectance, improving the reflective effect for light and avoiding the loss of light.

Besides the above mentioned structure realizing changing the propagation path of light by way of reflection, other ways (such as refraction) can also be applied for changing the propagation path of light. In such a situation, the optical components 40 comprise lenses 43, the lenses 43 are arranged one-to-one corresponding to every second light source elements 31 and change propagation path of light from the second light source elements 31 irradiating the first light source elements 21 such that the light is emitted through the intervals. Different structures can be used as the structure of the lenses 43, as will be illustrated with the following specific embodiment.

Embodiment 2

FIG. 2 shows another structure of the optical components. The lenses 43 provided in the embodiment are convex lenses 431; each of the convex lenses 431 corresponds to one second light source element 31. During the operation of the display device, as shown in FIG. 2, the light emitted from the second light source elements 31 enters the convex lenses 431. The convex lens 431 has a function of converging light: the direction of the light originally irradiating the first light source elements 21 is changed by the refraction of the convex lenses 431, such that the light irradiates the display panel 10 after passes through the intervals between the first light source elements 21, thereby improving the brightness of the display panel 10, and improving the display effect of the display device.

In particular, each of the convex lenses 431 one-to-one corresponds to each of the second light source elements 31; and the second light source element 31 is positioned on a focal plane of the corresponding convex lens 431, such that the light emitted from the second light source element 31 can be converged by the corresponding convex lens 431, ensuring that more light can irradiate the display panel 10. Preferably, the diameter of the convex lens 431 is 1~2 times of the width of the second light source element 31; in this way it is ensured that all of the light emitted from the second light source elements 31 can be converged by the convex lenses 431, improving the utilization of light. More preferably, the diameter of the convex lens 431 is two times of the width of the second light source element 31; in this way the manufacture of the convex lenses 431 and converging of light are facilitated.

During the manufacture, a primary exposure unit can be obtained by way of photolithography on a substrate; a micro rectangular array structure is firstly formed; then the substrate is heated, the hot-melt photoresist forms micro structure of the convex lens 431 due to the effect of surface tension; after heating and curing, the micro lenses structure is then coated with a flat layer. The flat layer can be made of organic material, of which the thickness is in millimeter level to ensure the flatness of the surface, facilitating the manufacture of the first light source layer 20. The micro structure of the convex lenses 431 can be made of polyester organic material, as long as the refractive index of the polyester organic material (e.g. polycarbonate, with a refractive index of 1.58) is higher than that of the substrate material.

Embodiment 3

Figure 3:
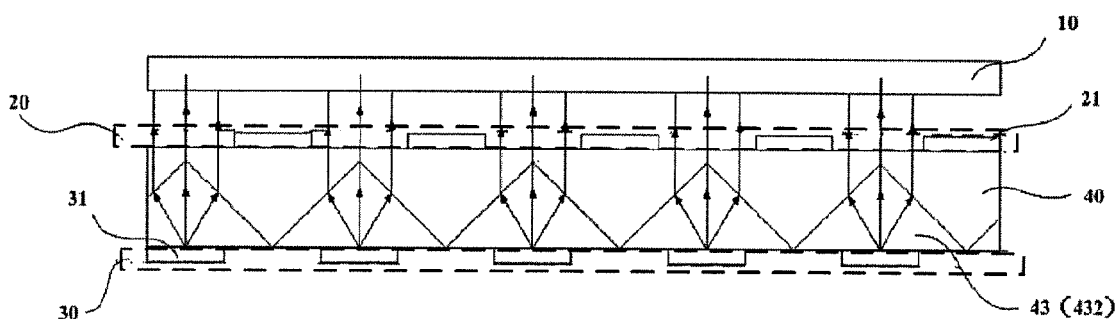
FIG. 3 is a structural schematic diagram of a backlight module provided by yet another embodiment of the present invention.

FIG. 3 shows yet another structure of the optical components. The lenses 43 provided in the embodiment are triple prisms 432; each of the triple prisms 432 corresponds to one second light source element 31. During the operation of the display device, as shown in FIG. 3, the light emitted from the second light source elements 31 enters the triple prisms 432. The triple prism 432 has a function of converging light: the direction of the light originally irradiating the first light source elements 21 is changed by the refraction of the triple prisms 432, such that the light irradiates the display panel 10 after passes through the intervals between the first light source elements 21, thereby improving the brightness of the display panel 10, and improving the display effect of the display device.

In particular, each of the triple prisms 432 one-to-one corresponds to each of the second light source elements 31; for the positioning of the triple prisms 432, different structures can be applied to refract light to the display panel 10, which light is emitted from the second light source elements 31 and irradiates the first light source elements 21. In particular, as shown in FIG. 3, the optical components 40 comprise a substrate material and triple prisms 432 arranged on the substrate material, wherein the refractive index of the triple prisms 432 is higher than that of the substrate material. Referring to FIG. 3 again, the positioning direction shown in FIG. 3 can be regarded as a reference direction; in such a situation, a surface of the triple prism 432 is an incident plane, and the other two surfaces are exit surfaces; the incident plane is positioned on and parallel to the second light source elements 31. The light emitted from the second light source elements 31 is refracted on the exit surfaces of the triple prisms 432. In this manner, the light can be converged into the intervals between the first light source elements 21, ensuring that the light can irradiate the display panel 10 after passes through the intervals, thereby improving the utilization of light, providing a brighter image displayed by the display device, and improving the display effect of the display device. Preferably, the width of the triple prism 432 is 1~2 times of the width of the second light source element 31; in this way it is ensured that all of the light emitted from the second light source elements 31 can be converged by the triple prisms 432, improving the utilization of light. More preferably, the diameter of the triple prism 432 is two times of the width of the second light source element 31; in this way the manufacture of the triple prisms 432 and converging of light are facilitated.

During the manufacture, a primary exposure unit can be obtained by way of photolithography on a substrate; a micro rectangular array structure is firstly formed; then the substrate is heated, the hot-melt photoresist forms micro structure of the triple prisms 432 due to the effect of surface tension; after heating and curing, the micro lenses structure is then coated with a flat layer. The flat layer can be made of organic material, of which the thickness is in millimeter level to ensure the flatness of the surface, facilitating the manufacture of the first light source layer 20. The micro structure of the triple prisms 432 can be made of polyester organic material, as long as the refractive index of the polyester organic material (e.g. polycarbonate, with a refractive index of 1.58) is higher than that of the flat layer material.

From the above mentioned embodiment 1, embodiment 2 and embodiment 3, it can be seen that different structures of the optical components 40 can be applied for changing the propagation path of light, improving the display effect of the display device. It should be understood that the optical components 40 provided in the embodiments of the present invention are not limited within the specific structures enumerated in the embodiments, other structures of the optical components 40 can also be applied in the embodiments of the present invention, as long as they can change the propagation path of light from the second light source elements 31 irradiating the first light source elements 21 such that the light irradiates the display panel 10 after passes through the intervals The first light source elements 21 and the second light source elements 31 can be same or different light source elements. Preferably, both the first light source elements 21 and the second light source elements 31 are organic light emitting diode lamp strips. In this way a good effect of illuminating can be ensured.

The present invention also provides a display device and an electronic equipment comprising the display device; wherein the display device comprises a display panel 10 and the backlight module mentioned in any one of the above embodiments, the backlight module is arranged on a light inputting side of the display panel.

The display device provided in the embodiments of the present invention can be any product or component with display function, such as liquid crystal panel, electronic paper, mobile phone, tablet computer, TV, monitor, notebook computer, digital photo frame, and navigator.

In the above mentioned embodiments, light can be provided to the display device by applying one or both of the light source layers, improving the adjustable range of the display brightness for the display device; meanwhile, in a situation that a low brightness is required for the display device, one of the first and the second light source layers can be turned off, reducing the operation time for a part of the light source elements, thereby improving the service life of the light source elements; moreover, when one of the first and the second light source layers fails, another light source layer can still provide light for the display device to ensure the normal operation of the display device, improving the emergency capability of the display device; furthermore, the utilization of light can also be improved by applying the optical components.

Apparently, the person skilled in the art may make various alterations and variations to the invention without departing the spirit and scope of the invention. As such, provided that these modifications and variations of the invention pertain to the scope of the claims of the invention and their equivalents, the invention is intended to embrace these alterations and variations.

The invention claimed is:

1. A backlight module, wherein the backlight module comprises:
    a first light source layer located at a surface of a light emitting side of the backlight module, the first light source layer comprises a plurality of first light source elements arranged with intervals;
    a second light source layer located at a surface opposite to the light emitting side of the backlight module, wherein the second light source layer comprises a plurality of second light source elements arranged one-to-one corresponding to positions of the intervals between adjacent first light source elements; and
    optical components arranged between the first light source layer and the second light source layer, the optical components change propagation path of light from the second light source elements irradiating the first light source elements such that the light is emitted through the intervals.

2. The backlight module according to claim 1, wherein the optical components comprise lenses, the lenses are arranged one-to-one corresponding to every second light source elements and change propagation path of light from the second light source elements irradiating the first light source elements such that the light is emitted through the intervals.

3. The backlight module according to claim 2, wherein the lenses are triple prisms.

4. The backlight module according to claim 3, wherein the triple prisms are normal triple prisms.

5. The backlight module according to claim 2, wherein the lenses are convex lenses.

6. The backlight module according to claim 5, wherein the diameter of the convex lens is 1~2 times of the width of the second light source element.

7. The backlight module according to claim 6, wherein the second light source element is positioned on a focal plane of the convex lens.

8. The backlight module according to claim 5, wherein the diameter of the convex lens is two times of the width of the second light source element.

9. The backlight module according to claim 5, wherein the material of the convex lenses is polyester organic material.

10. The backlight module according to claim 1, wherein the optical components comprise a first reflective layer arranged on a side of the first light source elements facing the second light source elements, and a second reflective layer arranged between adjacent second light source elements.

11. The backlight module according to claim 10, wherein the first reflective layer and the second reflective layer are metal layers with high reflectance.

12. The backlight module according to claim 1, wherein the width of the second light source element is not greater than the width of the interval between adjacent first light source elements.

13. The backlight module according to claim 1, wherein both the first light source elements and the second light source elements are organic light emitting diode lamp strips.

14. The backlight module according to claim 1, wherein the optical components comprise a substrate material and triple prisms arranged on the substrate material; the refractive index of the triple prisms is higher than that of the substrate material.

15. The backlight module according to claim 1, wherein the first light source elements and the second light source elements are same.

16. A display device, wherein the display device comprises a display panel and a backlight module, the backlight module is arranged on a light inputting side of the display panel; wherein the backlight module comprises:
    a first light source layer located at a surface on a light emitting side of the backlight module, which first light source layer comprises a plurality of first light source elements arranged with intervals;

a second light source layer located at a surface opposite to the light emitting side of the backlight module, wherein the second light source layer comprises a plurality of second light source elements arranged one-to-one corresponding to positions of the intervals between adjacent first light source elements; and optical components arranged between the first light source layer and the second light source layer, which optical components change propagation path of light from the second light source elements irradiating the first light source elements such that the light is emitted through the intervals.

17. An electronic equipment, wherein the electronic equipment comprises a display device comprising a display panel and a backlight module, the backlight module is arranged on a light inputting side of the display panel; wherein the backlight module comprises:

a first light source layer located at a surface on a light emitting side of the backlight module, which first light source layer comprises a plurality of first light source elements arranged with intervals;

a second light source layer located at a surface opposite to the light emitting side of the backlight module, wherein the second light source layer comprises a plurality of second light source elements arranged one-to-one corresponding to positions of the intervals between adjacent first light source elements; and optical components arranged between the first light source layer and the second light source layer, which optical components change propagation path of light from the second light source elements irradiating the first light source elements such that the light is emitted through the intervals.

18. The electronic equipment according to claim 17, wherein the optical components comprise lenses, which lenses are arranged one-to-one corresponding to every second light source elements and change propagation path of light from the second light source elements irradiating the first light source elements such that the light is emitted through the intervals.

19. The electronic equipment according to claim 18, wherein the lenses are triple prisms.

20. The electronic equipment according to claim 18, wherein the lenses are convex lenses.

\* \* \* \* \*